United States Patent
Lee et al.

(10) Patent No.: US 7,253,963 B2
(45) Date of Patent: Aug. 7, 2007

(54) INNER FOCUS TYPE ZOOM LENS SYSTEM

(75) Inventors: Sang Hyuck Lee, Seoul (KR); Ho Seop Jeong, Kyungki-do (KR); Chon Su Kyong, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/326,299

(22) Filed: Jan. 6, 2006

(65) Prior Publication Data
US 2006/0164732 A1    Jul. 27, 2006

(30) Foreign Application Priority Data
Jan. 27, 2005    (KR)    ............... 10-2005-0007586

(51) Int. Cl.
*G02B 15/14* (2006.01)
(52) U.S. Cl. .................. 359/686; 359/689; 359/680
(58) Field of Classification Search .......... 359/686, 359/680, 689
See application file for complete search history.

(56) References Cited

U.S. PATENT DOCUMENTS 6,515,803 B2 * 2/2003 Hirose .................. 359/682

2004/0179148 A1 * 9/2004 Nishioka et al. .......... 349/56

FOREIGN PATENT DOCUMENTS

JP    2004-177877    6/2004

* cited by examiner

*Primary Examiner*—Scott J. Sugarman
*Assistant Examiner*—Darryl J. Collins
(74) *Attorney, Agent, or Firm*—Lowe Hauptman & Berner

(57) ABSTRACT

An inner-focus type zoom lens system used for a camera module having an image sensor and using an LC lens is provided. The inner-focus type zoom lens system includes an objective lens group, a condensing lens group, at least one moving lens group, and an LC lens. The objective lens group is located most closely to an object side and fixed, and the condensing lens group is located most closely to an image side and fixed. The moving lens group is located between the objective lens group and the condensing lens group and moved for zooming. The LC lens includes an inner space filled with an LC material whose refractive index and abbe number change according to an applied voltage. The LC lens compensates for an image plane using the changes of the refractive index and the abbe number of the LC material when the zooming is performed by the moving of the moving lens.

8 Claims, 7 Drawing Sheets

INNER FOCUS TYPE ZOOM LENS SYSTEM

RELATED APPLICATION

The present application is based on, and claims priority from, Korean Application Number 2005-7586, filed Jan. 27, 2005, the disclosure of which is hereby incorporated by reference herein in its entirety.

BACKGROUND OF THE INVENTION

1. Field of the Invention

The present invention relates to a zoom lens system, and more particularly, to an inner-focus type zoom lens system for use in an image-pickup camera module having an image sensor therein.

2. Description of the Related Art

In a focusing system of a zoom lens, a front-focus type system for moving a first lens group closest to an object side is generally used. Since a movement amount of the first lens group required for focusing an object located at the same distance does not depend on a focal length of a lens in the front-focus type system, the front-focus type system is widely used.

However, since the front-focus type system moves the first lens group, which is relatively big and heavy, to perform focusing, the front-focus type system has a disadvantage that a focusing speed is slow and much driving power is required. Further, since a plurality of lenses are used so as to obtain excellent optical characteristics such as high resolution, a camera module has a large size and difficult to mount on a portable apparatus.

For another focusing system of a zoom lens, there is a rear-focus type system moving a lens located at an image-surface side. The rear-focus type system has a problem that a movement amount of a focusing lens required for focusing an object located at the same distance is varied depending on a zooming position (i.e., the focal length of the lens) and that a focus is lost when zooming is performed after focusing is once performed for a close distant object.

For another focusing system of a zoom lens, there is an inner-focus type system moving a lens located between an objective lens and a condensing lens.

The above focus type systems move one or more lens groups so as to perform zooming and move another lens group so as to correct an image plane formed by the moving of the lens group, so that a lens moving apparatus is complicated and is difficult to manufacture in a small size.

Therefore, a zoom lens system capable of achieving a sufficient zooming performance and high resolution by moving only one lens group, is highly required.

SUMMARY OF THE INVENTION

Accordingly, the present invention is directed to an inner-focus type zoom lens system that substantially obviates one or more problems due to limitations and disadvantages of the related art.

An object of the present invention is to provide an inner-focus type zoom lens system capable of achieving a sufficient zooming performance by moving only one lens group.

Another object of the present invention is to provide an inner-focus type zoom lens system capable of achieving high resolution and a small size using a small number of elements of lenses.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an inner-focus type zoom lens system including: an objective lens group located and fixed most closely to an object side; a condensing lens group located and fixed most closely to an image side and forming an image on an image-forming surface; at least one moving lens group located between the objective lens group and the condensing lens group and moving so as to perform zooming; and a liquid crystal (LC) lens having an inner space filled with a liquid crystal material whose refractive index and an abbe number change according to an applied voltage, wherein compensation of an image plane is performed using changes in the refractive index and the abbe number of the liquid crystal (LC) material when the zooming is performed using the moving of the moving lens group.

The LC lens may be moved together with the moving lens group, or remain fixed when the zooming is performed by the moving of the moving lens group.

The LC lens may include a first transparent substrate that corresponds to an object-side cover plane and a second transparent substrate that corresponds to an image-side cover plane and faces the first substrate with a predetermined interval interposed therebetween such that an inner space that is to be filled with the LC material is formed, and the refractive index of the LC material changes back and forth of the refractive index of the first substrate or the second substrate.

At least one of an image-side refractive surface of the first substrate and an object-side refractive surface of the second substrate may include a spherical plane or a non-spherical plane.

The thickness on an optical axis and the thickness on an effective aperture of the LC material may be in a range of 1-25 μm.

According to an aspect of the present invention, there is provided an inner-focus type zoom lens system including: a first lens group having a negative refractive power and fixed; a second lens group performing zooming by moving such that an interval between the first lens group and the second lens group reduces during zooming from a wide angle end to a telephoto end, and having an LC lens filled with an LC material whose refractive index and abbe number change according to an applied voltage to perform compensation of an image plane using the changes of the refractive index and the abbe number of the LC material, and having a positive refractive power on the whole; and a third lens group having a positive refractive power and fixed.

The LC lens may include a first transparent substrate that corresponds to an object-side cover plane and a second transparent substrate that corresponds to an image-side cover plane and faces the first substrate with a predetermined interval interposed therebetween such that an inner space that is to be filled with the LC material is formed, and the refractive index of the LC material changes back and forth of the refractive index of the first substrate or the second substrate.

According to another aspect of the present invention, there is provided an inner-focus type zoom lens system including: a first lens group having a negative refractive power and fixed; a second lens group having an LC lens filled with an LC material whose refractive index and abbe number change according to an applied voltage to perform compensation of an image plane using the changes of the refractive index and the abbe number of the LC material; a third lens group having a positive refractive power on the whole and performing zooming by moving such that an interval between the second lens group and the third lens group reduces during zooming from a wide angle end to a telephoto end; and a fourth lens group having a positive refractive power and fixed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 1A and 1B are views illustrating a lens configuration of an inner-focus type zoom lens system according to the first embodiment of the present invention, in which FIG. 1A and FIG. 1B represent a lens configuration at a wide angle end and a lens configuration at a telephoto end, respectively;

FIGS. 2A and 2B are views of an LC lens used for an inner-focus type zoom lens system according to the present invention, in which: FIG. 2A is a sectional view of an LC lens having a concave refractive surface, and FIG. 2B is a sectional view of an LC lens having a convex refractive surface;

FIGS. 3A, 3B, and 3C are graphs explaining aberrations at a wide angle end of the first embodiment shown in FIG. 1, in which FIG. 3A, FIG. 3B, and FIG. 3C represent a spherical aberration, astigmatism, and distortion, respectively;

FIGS. 4A, 4B, and 4C are graphs explaining aberrations at a telephoto end of the first embodiment shown in FIG. 1, in which FIG. 4A, FIG. 4B, and FIG. 4C represent a spherical aberration, astigmatism, and distortion, respectively;

FIGS. 5A and 5B are views illustrating a lens configuration of an inner-focus type zoom lens system according to the second embodiment of the present invention, in which FIG. 5A and FIG. 5B represent a lens configuration at a wide angle end and a lens configuration at a telephoto end, respectively;

FIGS. 6A, 6B, and 6C are graphs explaining aberrations at a wide angle end of the second embodiment shown in FIG. 5, in which FIG. 6A, FIG. 6B, and FIG. 6C represent a spherical aberration, astigmatism, and distortion, respectively; and FIGS. 7A, 7B, and 7C are graphs explaining aberrations at a telephoto end of the second embodiment shown in FIG. 5, in which FIG. 7A, FIG. 7B, and FIG. 7C represent a spherical aberration, astigmatism, and distortion, respectively;

DETAILED DESCRIPTION OF THE INVENTION

Reference will now be made in detail to the preferred embodiments of the present invention, examples of which are illustrated in the accompanying drawings.

Figure 1:
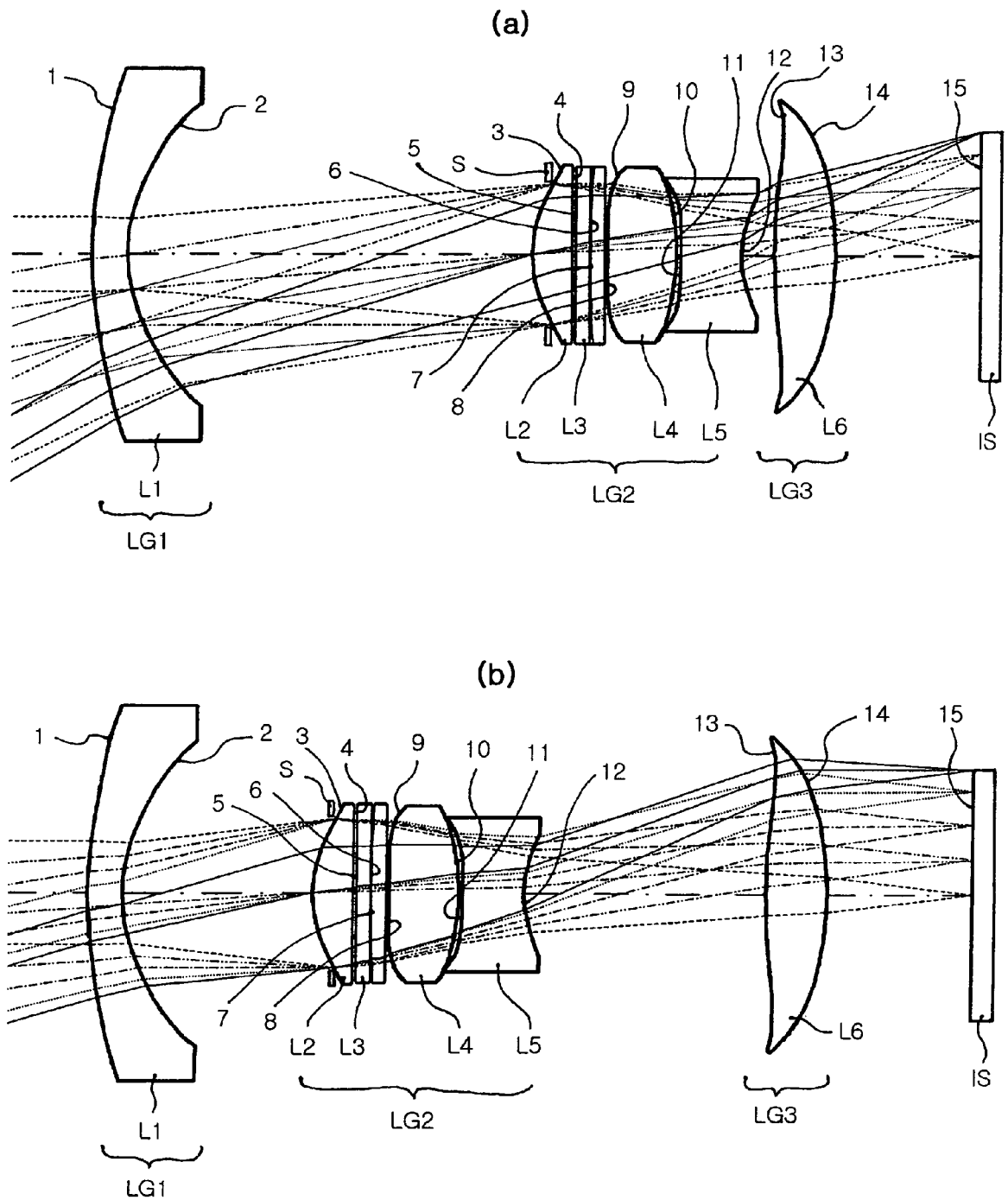
Figure 5:
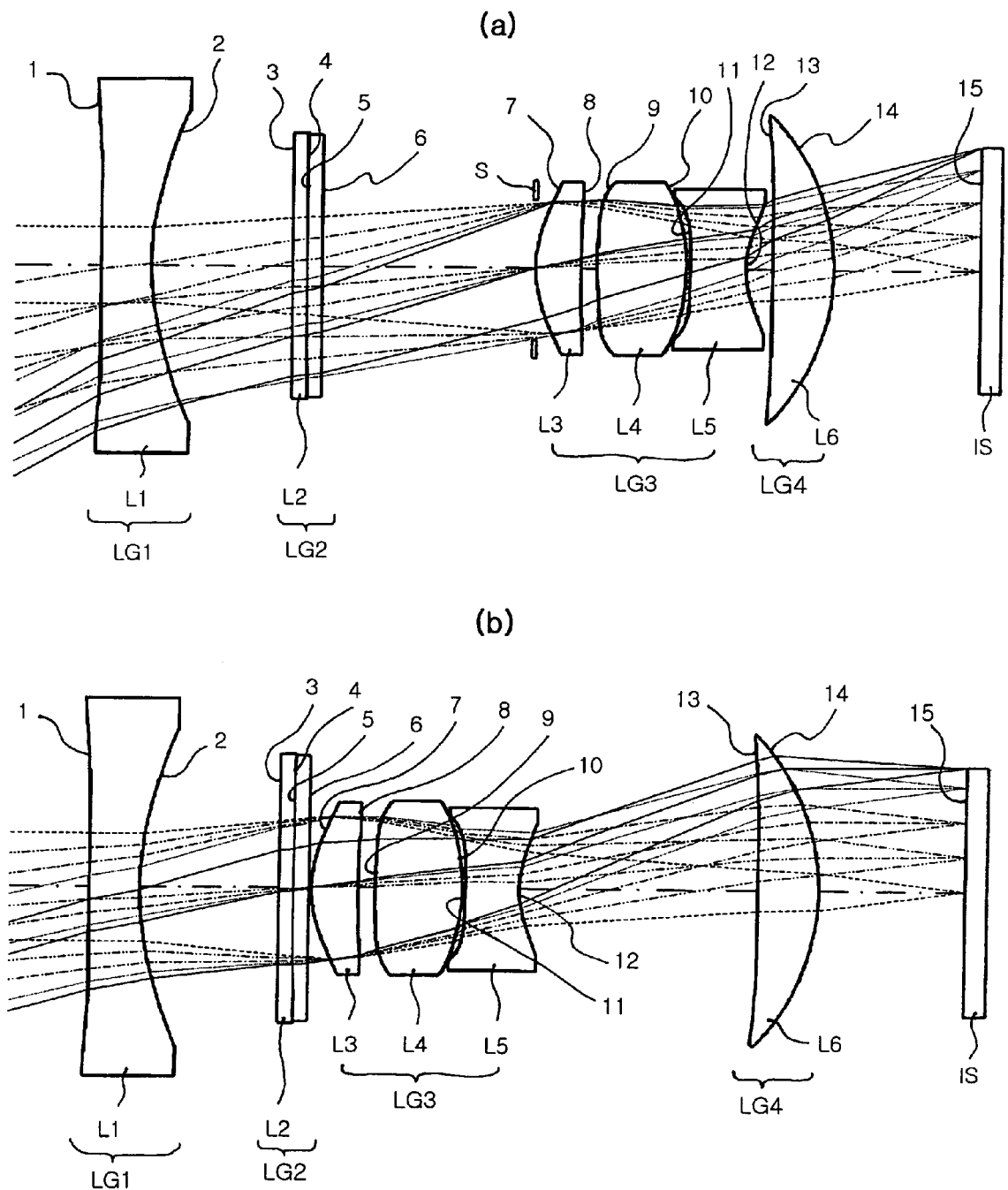

FIGS. 1 and 5 are views illustrating a lens configuration of an inner-focus type zoom lens system according to the first and second embodiments of the present invention. In FIGS. 1 and 5, the lens configuration, the thickness, the size, and the shape of the lens are exaggerated more or less for explanation, and particularly, a spherical surface or a non-spherical surface illustrated in the lens configuration has been provided for an exemplary purpose only and thus the shape of lens is not limited to this particular shape.

A camera module includes: a least one lens; a housing having a predetermined space formed in an inside thereof to receive the lens; an image sensor that corresponds to an image-forming surface of the lens; and a circuit board fixedly installed to one end of the housing and mounting the image sensor on one surface thereof so as to process the image sensed by the image sensor. The present invention relates to an inner-focus type zoom lens system for use in such a camera module.

The inner-focus type zoom lens system according to the present invention includes: an objective lens group located and fixed most closely to an object side and to which light is incident; a condensing lens group located and fixed most closely to an image side and forming an image on an image-forming surface; at least one moving lens group located between the objective lens group and the condensing lens group and moving so as to perform zooming; and an LC lens having an inner space filled with an LC material whose refractive index and abbe number change according to an applied voltage.

When the zooming is performed using the moving of the moving lens group, the LC lens compensates for an image plane using the changes of the refractive index and the abbe number of the LC material. The LC lens may be provided to the fixed objective lens group, the fixed condensing lens group, or the moving lens group that moves during the zooming.

For example, referring to FIG. 1 illustrating the first embodiment of the present invention, the objective lens group, the moving lens group, the condensing lens group, and the LC lens group constitute the first lens group LG1, the second lens group LG2, the third lens group LG3, and the third lens L3, respectively.

At this point, the third lens L3 consisting of the LC lens moves together with the second lens group LG2 when the second lens group LG2 moves during the zooming, and the refractive index of an LC material contained in the inner space of the LC lens changes during the zooming to correct an image plane.

Also, referring to FIG. 5 illustrating the second embodiment of the present invention, the objective lens group, the moving lens group, the condensing lens group, and the LC lens group constitute the first lens group LG1, the third lens group LG3, the fourth lens group LG4, and the second lens L2, respectively.

At this point, the second lens L2 consisting of the LC lens remains fixed when the third lens group LG3 moves during the zooming, and the refractive index of an LC material contained in the inner space of the LC lens changes during the zooming to correct an image plane.

The LC lens used for auto-focusing includes an LC material interposed between transparent substrates such as glass, and transparent electrodes for applying a voltage to the LC material. It is possible to electrically change the refractive index of the LC material and thus change the focal length of the LC lens by changing a voltage applied to the transparent electrodes.

The inner-focus type zoom lens system according to the present invention may correct the image plane formed by the zooming using the LC lens, so that only one lens group may be moved during the zooming.

Therefore, when the zooming is performed according to the present invention, two or more lens group do not need to be moved for compensation of the image plane unlike the conventional art, so that the moving of the lens is easy and the small sizing of the camera module may be achieved.

FIGS. 2A and 2B are sectional views of an LC lens used for the inner-focus type zoom lens system according to the present invention.

Figure 2:
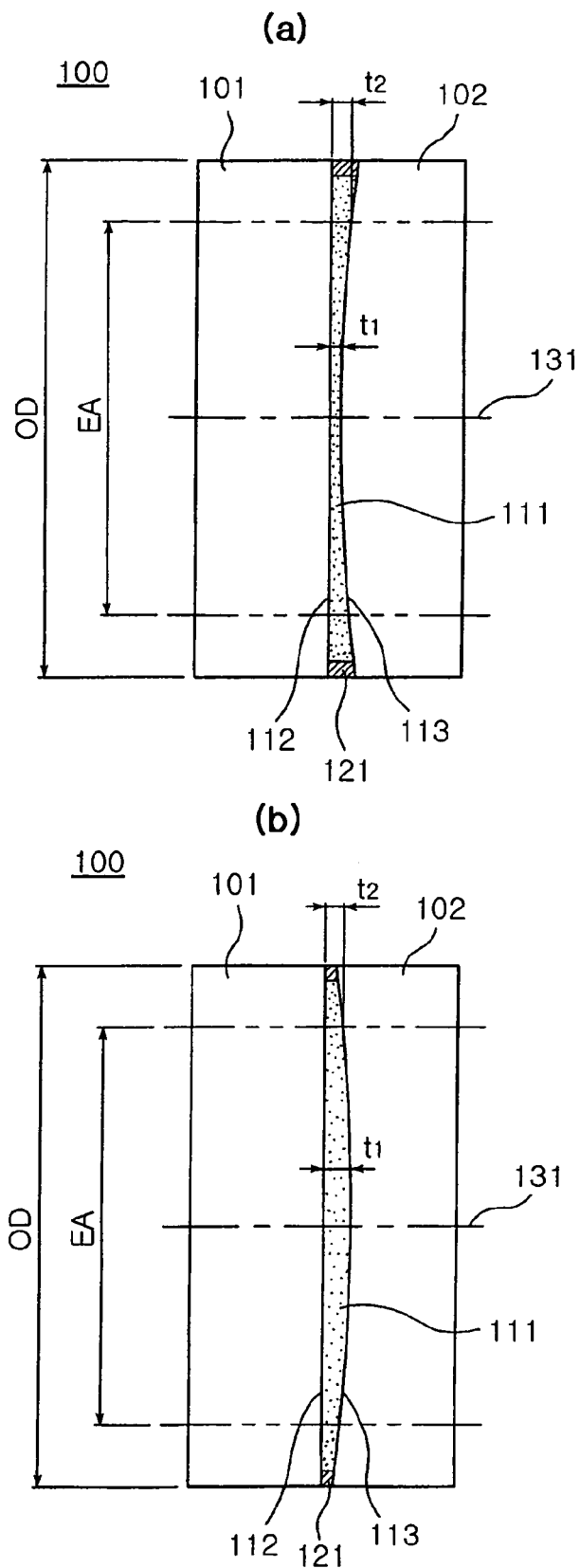

Referring to FIG. 2, the LC lens 100 includes the first transparent substrate 101 that corresponds to an object-side cover plane; the second transparent substrate 102 that corresponds to an image-side cover plane and faces the first transparent substrate 101 with a predetermined interval interposed therebetween; an LC material 111 filling an inner space formed between the first transparent substrate 111 and the second transparent substrate 102; and a sealing member 121 for sealing the inner space.

The sealing member 121 may be a damper film allowing the volume change of the LC material 111 caused by temperature change.

Also, the LC lens 100 includes the first transparent electrode 112 on the first substrate side 101 and the second transparent electrode 113 on the second substrate side 102 so as to apply a voltage to the LC material 111.

When the voltage is applied to the LC material 111 through the first and second electrodes 112 and 113, the refractive index of the LC material 111 changes according to the applied voltage.

Therefore, it is possible to adjust a focus and correct an image plane by controlling the size of the voltage applied to the LC material 111 as the moving lens group moves during the zooming.

At this point, the refractive index of the LC material 111 may be set to change back and forth of the refractive index of the first and second substrates 101 and 102.

For example, when a transparent substrate having a refractive index 1.517 is used for the first and second substrates 101 and 102 and the refractive index of the LC material 111 is changed in the range of 1.5-1.7, it is possible to realize a concave refractive surface and a convex refractive surface with one refractive surface using a difference in the refractive index between the first and second substrates 101 and 102 and the LC material 111.

That is, since the refractive power of the LC lens 100 changes from positive to negative, or negative to positive, it is possible to achieve a wide range of auto focus and image compensation.

The LC material 111 may be a known material (e.g., nematic LC), so that the focal length of the LC lens is variable regardless of the polarization direction of incident light. It is possible to obtain a desired refractive index and abbe number by applying a predetermined voltage to the LC material.

Also, it is possible to achieve desired optical characteristics by forming the boundary surface between the first substrate 101 and the LC material 111 or between the second substrate 102 and the LC material 111 using a spherical surface or an aspherical surface.

That is, referring to FIG. 2A, it is possible to form the boundary surface (the object-side refractive surface of the second substrate 102) between the second substrate 102 and the LC material 111 such that the object-side refractive surface of the second substrate 102 may be convex with respect to an object side. Referring to FIG. 2B, it is possible to form the boundary surface (the object-side refractive surface of the second substrate 102) between the second substrate 102 and the LC material 111 such that the object-side refractive surface of the second substrate 102 may be concave with respect to an object side.

Alternatively, it is possible to form the boundary surface (the image-side refractive surface of the first substrate) between the first substrate 101 and the LC material 111 such that the image-side refractive surface of the first substrate may be a spherical or aspherical surface concave or convex with respect to an object side.

Also, a concave or convex refractive surface may be provided on an object side of the first substrate 101 or an image side of the second substrate 102 so as to meet optical characteristics of a lens system.

Referring to FIG. 2, the LC lens 100 has an outer diameter (OD) and an effective aperture (EA).

At this point, the thickness t1 on an optical axis 131 and the thickness t2 on the effective aperture EA of the LC material 111 may be in a range of 1-25 µm.

Since a response time consumed until a desired focal length is achieved after a voltage is applied is proportional to the square of the thickness of the LC material 111, a response time is lengthened in the case where the thicknesses t1 and t2 on the optical axis 131 and the effective aperture EA are greater than 25 µm exceeding an upper limit.

On the contrary, in the case where the thicknesses t1 and t2 on the optical axis 131 and the effective aperture EA are smaller than 1 µm below a lower limit, the LC lens 100 is difficult to manufacture. Particularly, since the thickness of the LC material 111 should be made large so as to increase the change of a focal length, a desired focal length is difficult to achieve and thus a sufficient zoom ratio is difficult to achieve.

The present invention will be described with reference to detailed numerical embodiments below.

An aspherical surface used for each embodiment below is obtained from known Equation 1.

$$z=(Y^2/r)[1+\sqrt{1-(1+K)(Y/r)^2}]+AY^4+BY^6+CY^8+DY^{10} \quad (1),$$

where

Z: distance toward an optical axis direction from the vertex of a lens

Y: distance toward a direction perpendicular to an optical axis r: radius of curvature at the vertex of a lens K: conic constant A, B, C, and D: aspherical coefficients E and a number following the E used in a conic constant K and aspherical coefficients A, B, C, and D represent a 10's power. For example, E+21 and E−05 represent $10^{21}$ and $10^{-5}$, respectively.

FIRST EMBODIMENT

FIGS. 1A and 1B are views illustrating lens configurations at a wide angle end and at a telephoto end, respectively, in an inner-focus type zoom lens system according to the first embodiment of the present invention.

Referring to FIGS. 1A and 1B, the inner-focus type zoom lens system includes, sequentially from an object side: a first lens group LG1 having a negative refractive power and fixed; a second lens group LG2 having a positive refractive power and performing zooming by moving such that an interval between the first lens group LG1 and the second lens group LG2 reduces during zooming from a wide angle end to a telephoto end, and having an LC lens; and a third lens group LG3 having a positive refractive power and fixed.

At this point, the first lens group LG1 having a weak negative refractive power and the third lens group LG3 having a weak positive refractive power are fixed. The second lens group LG2 having a positive refractive power greater than that of the third lens group LG3 is moved such that an interval between the first lens group LG1 and the second lens group LG2 reduces during zooming from a wide angle end to a telephoto end.

That is, since the first lens group LG1 has a negative refractive power and allows light to diverge, the second lens group LG2 is configured to have a positive refractive power and to move such that the interval between the first lens group LG1 and the second lens group LG2 reduces during zooming from a wide angle end to a telephoto end.

Also, the second lens group LG2 includes an LC lens L3. As described above, the refractive index and the abbe number of an LC material contained in the LC lens L3 change according to an applied voltage to correct an image plane.

The LC lens L3 has a shape illustrated in FIG. 2A.

That is, the LC lens L3 includes a first transparent substrate 101 that corresponds to an object-side cover plane and a second transparent substrate 102 that corresponds to an image-side cover plane and faces the first substrate 101 with a predetermined interval interposed therebetween such that an inner space that is to be filled with the LC material 111 is formed. The object-side refractive surface of the second substrate 102 is convex with respect to an object side.

Also, the refractive index of the LC material 111 changes back and forth of the refractive index of the first substrate or the second substrate.

That is, according to the first embodiment of the present invention, the first and second substrates 101 and 102 may be transparent glass substrates having a refractive index 1.517 and an abbe number 64.1. At this point, the refractive index and the abbe number of the LC material 111 are 1.50 and 65.0, respectively, at a wide angle end, and are 1.70 and 30.0, respectively, at a telephoto end.

An optical filter including an infrared filter (IF) and a cover glass (CG) may be provided in the rear side of the third lens group LG3 but the optical filter does not have an influence, in principle, on an optical characteristics of the present invention.

Also, an image sensor IS consists of a solid image-pickup element (e.g., charged coupled device (CCD)) or a CMOS sensor. The image sensor is arranged behind the third lens group LG3 to correspond to the image plane 15 (photosensitive plane) for receiving an image formed by a lens.

In detail, the first lens group LG1 consists of only the first lens L1 that is a negative meniscus lens convex with respect to an object side.

Also, the second lens group LG2 includes: the second lens L2 having a positive refractive power on the whole and that is a positive meniscus lens convex with respect to an object side; the third lens L3 that is an LC lens whose refractive index and abbe number change according to an applied voltage; the fourth lens L4 convex to both sides; and the fifth lens L5 whose image-side refractive surface is concave. The third lens group LG3 consists of only the sixth lens L6 having a positive refractive power.

An open aperture S is located in front of the object-side refractive surface 3 of the second lens L2 and moved together with the second lens group LG2 during zooming.

Table 1 represents numerical examples according to the first embodiment of the present invention.

FIGS. 3A, 3B, and 3C represent a spherical aberration, astigmatism, and distortion, respectively, at a wide angle end in the lens system illustrated in FIG. 1 and Table 1. FIGS. 4A, 4B, and 4C represent a spherical aberration, astigmatism, and distortion, respectively, at a telephoto end in the lens system illustrated in FIG. 1 and Table 1. At this point, in the drawing illustrating astigmatism, "S" represents sagittal and "T" represents tangential.

According to the first embodiment, the effective focal length $f_w$ of an entire lens system at a wide angel end is 6.0 mm, the effective focal length $f_T$ of an entire lens system at a telephoto end is 12.0 mm, and a zoom ratio $f_T/f_W$ is 2.0.

Also, the effective focal length $f_I$ of the first lens group LG1 is −13.13 mm, the effective focal length $f_{II}$ of the second lens group LG2 is 8.3 mm at a wide angle end and 7.95 mm at a telephoto end, and the effective focal length $f_{III}$ of the third lens group LG3 is 10.86 mm.

Also, an F number $F_{No}$ is 2.8 at a wide angle end and 4.0 at a telephoto end, a lens' entire angle of view 2ω is 62° at a wide angle end and 33° at a telephoto end, and the total length TL between the object-side refractive surface 1 of the first lens L1 of the first lens group LG1 and an image plane is 25.0 mm.

TABLE 1

| surface No. | Radius of curvature R (mm) | Interval between surfaces t (mm) | Refractive index $n_d$ | Abbe number $v_d$ | Remark |
|---|---|---|---|---|---|
| *1 | 10.185 | 1.0000 | 1.632 | 63.8 | 1st lens |
| *2 | 4.411 | ✗variable1 | | | |
| *3 | 3.474 | 1.1420 | 1.530 | 55.5 | 2nd lens |
| *4 | 68.071 | 0.1054 | | | |
| 5 | ∞ | 0.4000 | 1.517 | 64.1 | 3rd lens |
| 6 | ∞ | 0.0010 | ✗variable3 | ✗variable4 | (LC lens) |
| 7 | 47.645 | 0.3990 | 1.517 | 64.1 | |
| 8 | ∞ | 0.1000 | | | |
| *9 | 88.031 | 1.9418 | 1.632 | 63.8 | 4th lens |
| *10 | −5.794 | 0.1038 | | | |
| *11 | 400.235 | 1.7304 | 1.755 | 27.5 | 5th lens |
| *12 | 2.817 | ✗variable2 | | | |
| *13 | 16.420 | 1.6702 | 1.627 | 59.0 | 6th lens |
| *14 | −11.261 | 4.1322 | | | |
| 15 | ∞ | — | — | — | Image plane |

In Table 1, ✗ variables 1, 2, 3, and 4 represent refractive surfaces whose surface intervals change during the zooming, the refractive index and the abbe number of the LC lens. The surface intervals, the refractive index, and the abbe number of the LC lens at a wide angle end and a telephoto end are given by Table 2.

TABLE 2

| | Wide angle end | Telephoto end | Remark |
|---|---|---|---|
| Variable 1 | 11.3603 | 5.3925 | Surface interval (mm) |
| Variable 2 | 0.91 | 6.8778 | Surface interval (mm) |

TABLE 2-continued

| | Wide angle end | Telephoto end | Remark |
|---|---|---|---|
| Variable 3 | 1.500 | 1.700 | Refractive index |
| Variable 4 | 65.0 | 30.0 | Abbe number |

In Table 1, * represents an aspherical surface. Conic constant K, and coefficients A, B, C, and D of an aspherical surface according to Equation 1 are given by Table 3.

TABLE 3

| Number of surface | K | A | B | C | D |
|---|---|---|---|---|---|
| 1 | −2.451162 | −1.66E−03 | 6.14E−05 | −6.45E−07 | |
| 2 | −0.575926 | −2.36E−03 | 5.57E−05 | 8.52E−07 | |
| 3 | −1.002488 | 1.84E−04 | −4.96E−05 | −5.59E−05 | |
| 4 | −9.53E+21 | 9.08E−04 | −2.47E−04 | 1.11E−05 | 9.92E−07 |
| 9 | −3.08E+26 | 6.38E−03 | −1.75E−04 | 1.65E−04 | |
| 10 | −2.825352 | 4.06E−03 | −2.41E−05 | −1.29E−06 | |
| 11 | −6.26E+29 | −1.75E−02 | 9.19E−04 | −5.58E−04 | |
| 12 | −3.143946 | −6.97E−03 | 1.98E−03 | −3.71E−04 | 3.45E−05 |
| 13 | −74.445822 | 8.44E−04 | −8.59E−05 | 5.21E−06 | |
| 14 | −8.46E−04 | −5.38E−06 | −1.57E−06 | | |

Figure 3:
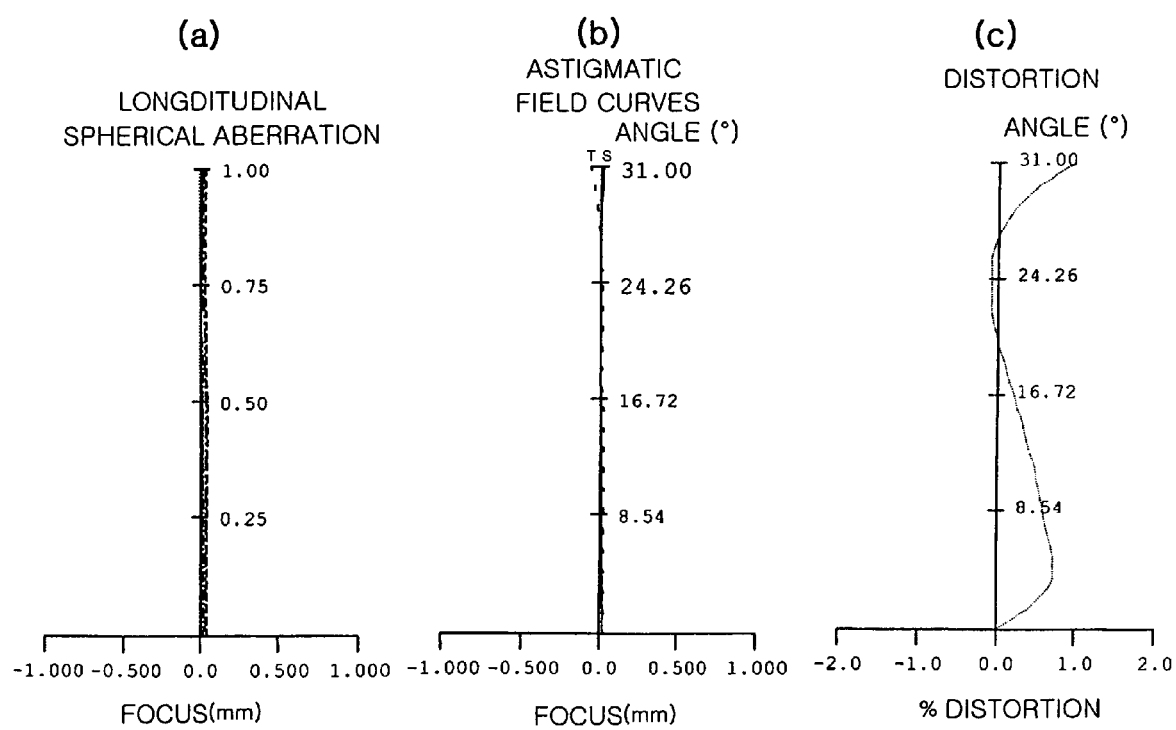
Figure 4:
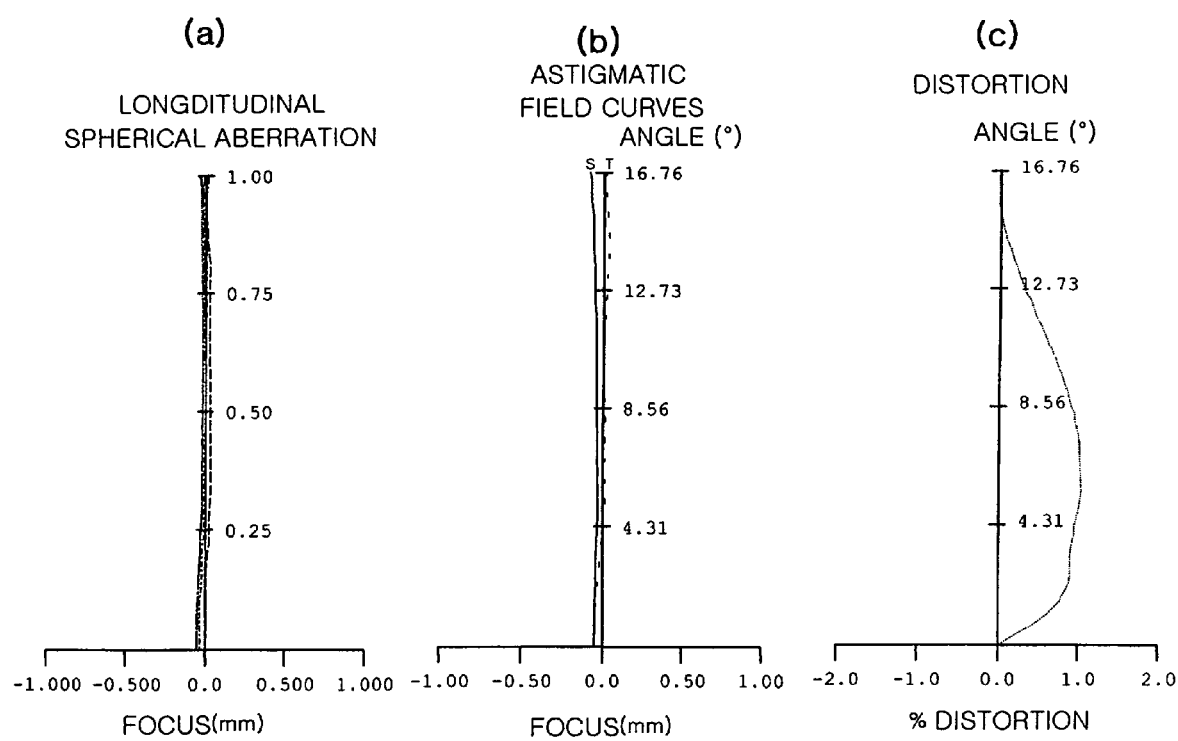

The inner-focus type zoom lens system according to the first embodiment of the present invention can perform zooming and correct an image plane by moving only the second lens group LG2 that includes the LC lens. Also, the inventive inner-focus type zoom lens system can achieve excellent aberration characteristics as illustrated in FIGS. 3 and 4 using only six elements of lenses and thus can be manufactured in a small size.

SECOND EMBODIMENT

FIGS. 5A and 5B are views illustrating lens configurations at a wide angle end and at a telephoto end, respectively, in an inner-focus type zoom lens system according to the second embodiment of the present invention.

Descriptions for the parts same as or similar to those in the first embodiment will be omitted for convenience.

Referring to FIGS. 5A and 5B, the inner-focus type zoom lens system includes, sequentially from an object side: a first lens group LG1 having a negative refractive power and fixed; the second lens group LG2 having an LC lens L2 and fixed; a third lens group LG3 having a positive refractive power on the whole and performing zooming by moving such that an interval between the second lens group LG2 and the third lens group LG3 reduces during zooming from a wide angle end to a telephoto end; and a fourth lens group LG4 having a positive refractive power and fixed. An image sensor IS is located behind the fourth lens group LG4.

At this point, the first lens group LG1 having a weak negative refractive power and the fourth lens group LG4 having a weak positive refractive power are fixed. The third lens group LG3 having a positive refractive power greater than that of the fourth lens group LG4 is moved such that an interval between the second lens group LG2 and the third lens group LG3 reduces during zooming from a wide angle end to a telephoto end.

That is, since the first lens group LG1 has a negative refractive power and allows light to diverge, the third lens group LG3 is configured to have a positive refractive power and to move such that the interval between the second lens group LG2 and the third lens group LG3 reduces during zooming from a wide angle end to a telephoto end.

Also, the second lens group LG2 includes an LC lens L2. As described above, the refractive index and the abbe number of an LC material contained in the LC lens L2 change according to an applied voltage to correct an image plane. The LC lens L2 has the shape and the structure as illustrated in FIG. 2A as described with reference to the first embodiment.

In detail, according to the second embodiment, the first lens group LG1 consists of only the first lens L1 that is a negative meniscus lens convex with respect to an object side, and the second lens group LG2 consists of only the second lens L2 that is an LC lens whose refractive index and abbe number change according to an applied voltage. The third lens group LG3 consists of three elements of lenses (i.e., the third lens L3, the fourth lens L4, and the fifth lens L5) and has a positive refractive power on the whole. Also, the fourth lens group LG4 consists of only the sixth lens L6 having a positive refractive power, and an open aperture S is located in front of the object-side refractive surface 7 of the third lens L3 and moved together with the third lens group LG3 during the zooming.

Table 4 represents numerical examples according to the second embodiment of the present invention.

FIGS. 5A and 5B are views illustrating lens configurations at a wide angle end and at a telephoto end, respectively, in an inner-focus type zoom lens system according to the second embodiment of the present invention. FIGS. 6A, 6B, and 6C represent a spherical aberration, astigmatism, and distortion, respectively, at a wide angle end in the lens system illustrated in FIG. 5 and Table 4. FIGS. 7A, 7B, and 7C represent a spherical aberration, astigmatism, and distortion, respectively, at a telephoto end in the lens system illustrated in FIG. 5 and Table 4. At this point, in the drawing illustrating astigmatism, "S" represents sagittal and "T" represents tangential.

According to the second embodiment, the effective focal length $f_W$ of an entire lens system at a wide angel end is 6.2 mm, the effective focal length $f_T$ of an entire lens system at a telephoto end is 12.4 mm, and a zoom ratio $f_T/f_W$ is 2.0.

Also, the effective focal length $f_I$ of the first lens group LG1 is −15.11 mm, the effective focal length $f_{II}$ of the second lens group LG2 is −1630 mm at a wide angle end and 1450 mm at a telephoto end, the effective focal length $f_{III}$ of the third lens group LG3 is 8.48 mm, and the effective focal length $f_{IV}$ of the fourth lens LG4 is 10.0 mm. At this point, since the refractive power of the second lens group LG2 consisting of only the LC lens L2 changes from negative to positive, the second lens group LG2 can correct an image plane over a wide range.

Also, an F number $F_{No}$ is 2.8 at a wide angle end and 4 at a telephoto end, a lens' entire angle of view 2ω is 62° at a wide angle end and 33° at a telephoto end, and the total length TL between the object-side refractive surface 1 of the first lens L1 of the first lens group LG1 and an image plane is 24.96 mm.

TABLE 4

| surface No. | Radius of curvature R (mm) | Interval between surfaces t (mm) | Refractive index $n_d$ | Abbe number $v_d$ | Remark |
|---|---|---|---|---|---|
| *1 | 45.722 | 1.4751 | 1.549 | 64.7 | 1st lens |
| *2 | 6.971 | 3.9982 | | | |
| 3 | ∞ | 0.4000 | 1.517 | 64.1 | 2nd lens |
| 4 | ∞ | 0.0010 | X-variable3 | X-variabl4 | (LC |
| 5 | 178.353 | 0.3990 | 1.517 | 64.1 | lens) |
| 6 | ∞ | X-variable1 | | | |
| *7 | 3.591 | 1.3188 | 1.530 | 55.5 | 3rd lens |
| *8 | 3.896 | 0.4300 | | | |
| *9 | 3.700 | 2.4773 | 1.621 | 60.1 | 4th lens |
| *10 | -5.216 | 0.1000 | | | |
| *11 | -16.395 | 1.5552 | 1.711 | 29.5 | 5th lens |
| *12 | 2.601 | X-variable2 | | | |
| *13 | 336.569 | 1.7615 | 1.620 | 60.3 | 6th lens |
| *14 | -6.332 | 4.2222 | | | |
| 15 | ∞ | — | — | — | Image plane |

In Table 4, X-variables 1, 2, 3, and 4 represent refractive surfaces whose surface intervals change during the zooming, the refractive index and the abbe number of the LC lens.

In Table 4, X variables 1, 2, 3, and 4 represent refractive surfaces whose surface intervals change during the zooming, the refractive index and the abbe number of the LC lens. The surface intervals, the refractive index, and the abbe number of the LC lens at a wide angle end and a telephoto end are given by Table 5.

TABLE 5

| | Wide angle end | Telephoto end | Remark |
|---|---|---|---|
| Variable 1 | 6.1032 | 0.1032 | Surface interval (mm) |
| Variable 2 | 0.62 | 6.72 | Surface interval (mm) |
| Variable 3 | 1.500 | 1.700 | Refractive index |
| Variable 4 | 65.0 | 30.0 | Abbe number |

In Table 4, * represents an aspherical surface. Conic constant K, and coefficients A, B, C, and D of an aspherical surface according to Equation 1 are given by Table 6.

TABLE 6

| Number of surface | K | A | B | C | D |
|---|---|---|---|---|---|
| 1 | 65.384905 | -1.82E-03 | 6.51E-05 | -9.67E-06 | |
| 2 | -0.857212 | -2.38E-03 | 9.57E-05 | -1.31E-06 | |
| 7 | -1.227769 | 3.88E-04 | -8.11E-05 | -6.01E-05 | -6.50E-06 |
| 8 | -9.53E+21 | 2.14E-03 | -9.86E-05 | -7.96E-06 | -5.53E-06 |
| 9 | -3.08E+26 | 7.95E-03 | -3.67E-05 | 9.04E-05 | |
| 10 | -1.745512 | 3.46E-03 | -5.93E-04 | -3.98E-05 | |
| 11 | -6.26E+29 | -2.17E-02 | 5.43E-04 | -3.14E-04 | |
| 12 | -3.223714 | -8.21E-03 | 1.91E-03 | -2.23E-04 | 1.71E-05 |
| 13 | -72688.6109 | -2.09E-04 | -7.89E-05 | 1.14E-05 | |
| 14 | | -8.87E-04 | -1.44E-06 | -3.06E-07 | |

Figure 6:
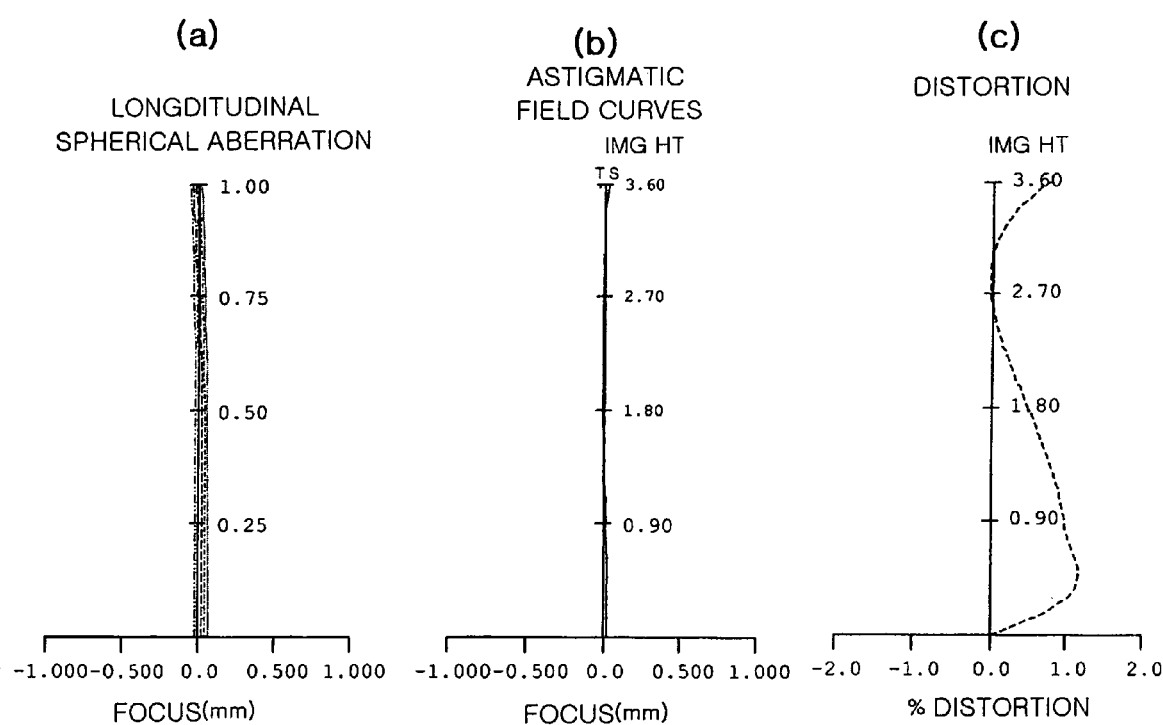
Figure 7:
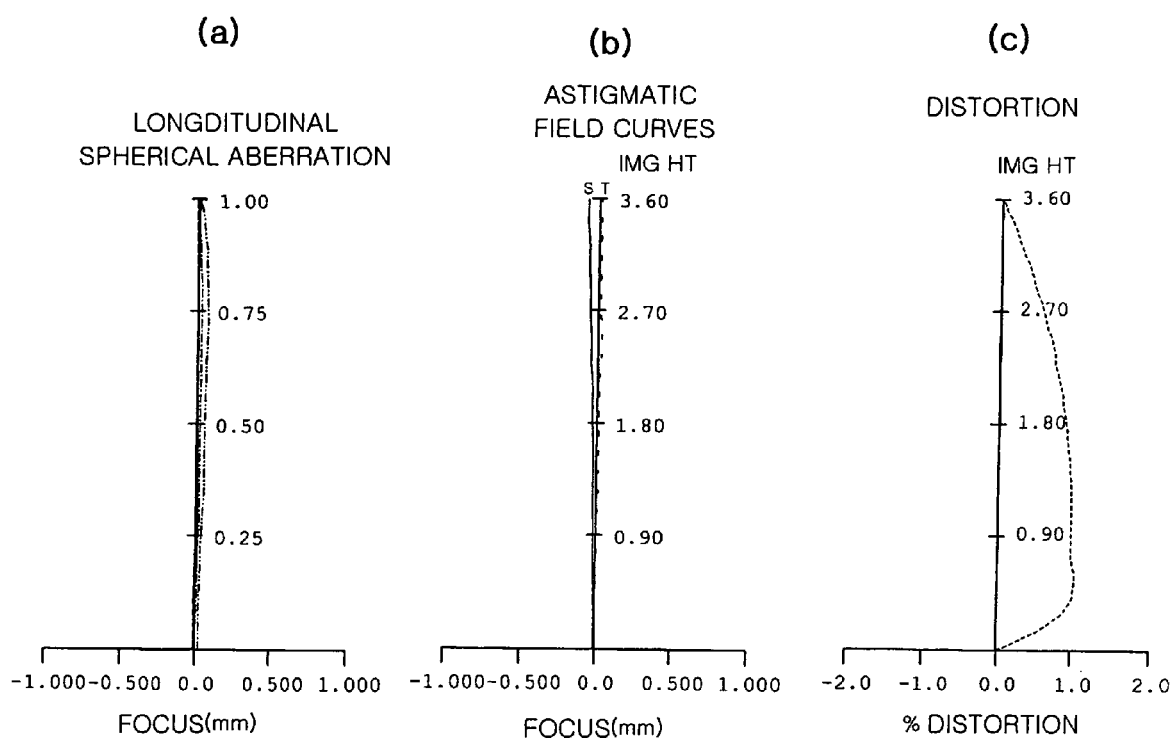

The inner-focus type zoom lens system according to the second embodiment of the present invention can perform zooming and correct an image plane by moving only the second lens group LG2 that includes the LC lens. Also, the inventive inner-focus type zoom lens system can achieve excellent aberration characteristics as illustrated in FIGS. 6 and 7 using only six elements of lenses and thus can be manufactured in a small size.

According to the present invention, it is possible to realize the inner-focus type zoom lens system having a sufficient zooming performance while moving only one lens group by using an LC lens.

Also, the inner-focus type zoom lens system of the present invention can achieve high resolution using a small number of elements of lens, and thus can be manufactured in a small size.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An inner-focus zoom lens system, comprising:
   a first, fixed lens group having a negative refractive power;
   a second, moving lens group for performing zooming by moving such that an interval between the first lens group and the second lens group reduces during zooming from a wide angle end to a telephoto end, said second lens group having an LC (liquid crystal) lens filled with an LC material whose refractive index and abbe number change according to an applied voltage to compensate for an image plane using the changes of the refractive index and the abbe number of the LC material, and said second lens group having a positive refractive power; and
   a third, fixed lens group having a positive refractive power.

2. The system of claim 1, wherein the LC lens comprises: a first transparent substrate that corresponds to an object-side cover plane; and a second transparent substrate that corresponds to an image-side cover plane and faces the first substrate with a predetermined interval therebetween to define an inner space filled with the LC material, and the refractive index of the LC material changes back and forth of the refractive index of the first substrate or the second substrate.

3. The system of claim 2, wherein at least one of an image-side refractive surface of the first substrate and an object-side refractive surface of the second substrate comprises a spherical surface or a non-spherical surface.

4. The system of claim 2, wherein the thickness on an optical axis and the thickness on an effective aperture of the LC material are in a range of 1-2 μm, respectively.

5. An inner-focus zoom lens system, comprising:
a first, fixid lens group having a negative refractive power;
a second lens group having an LC (liquid crystal) lens filled with an LC material whose refractive index and abbe number change according to an applied voltage to compensate for an image plane using the changes of the refractive index and the abbe number of the LC material;
a third, moving lens group having a positive refractive power for performing zooming by moving such that an interval between the second lens group and the third lens group reduces during zooming from a wide angle end to a telephoto end; and
a fourth, fixed lens group having a positive refractive power.

6. The system of claim 5, wherein the LC lens comprises: a first transparent substrate that corresponds to an object-side cover plane; and a second transparent substrate that corresponds to an image-side cover plane and faces the first substrate with a predetermined interval therebetween to define an inner space filled with the LC material, and the refractive index of the LC material changes back and forth of the refractive index of the first substrate or the second substrate.

7. The system of claim 6, wherein at least one of an image-side refractive surface of the first substrate and an object-side refractive surface of the second substrate comprises a spherical surface or a non-spherical plane.

8. The system of claim 6, wherein the thickness on an optical axis and the thickness on an effective aperture of the LC material are in a range of 1 -25 μm, respectively.

* * * * *